US011776458B2

(12) United States Patent
Jang et al.

(10) Patent No.: US 11,776,458 B2
(45) Date of Patent: Oct. 3, 2023

(54) DISPLAY DEVICE AND METHOD OF OPERATION THE SAME

(71) Applicant: Samsung Display Co., Ltd., Yongin-Si (KR)

(72) Inventors: Wonwoo Jang, Seoul (KR); Seungho Park, Suwon-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 17/895,648

(22) Filed: Aug. 25, 2022

(65) Prior Publication Data

US 2023/0230525 A1 Jul. 20, 2023

(30) Foreign Application Priority Data

Jan. 17, 2022 (KR) ........................ 10-2022-0006861

(51) Int. Cl.
*G09G 3/20* (2006.01)
*G09G 3/3208* (2016.01)
*G06T 7/13* (2017.01)
*G09G 3/30* (2006.01)

(52) U.S. Cl.
CPC ............. *G09G 3/2096* (2013.01); *G06T 7/13* (2017.01); *G09G 3/30* (2013.01); *G09G 3/3208* (2013.01); *G09G 2300/0452* (2013.01); *G09G 2320/0233* (2013.01); *G09G 2320/0242* (2013.01)

(58) Field of Classification Search
CPC ...... G09G 3/2096; G09G 3/30; G09G 3/3208; G09G 2300/0452; G09G 2320/0242; G06T 7/13
See application file for complete search history.

(56) References Cited

U.S. PATENT DOCUMENTS

| | | | | |
|---|---|---|---|---|
| 7,176,940 | B2 | 2/2007 | Choe et al. | |
| 7,602,401 | B2 | 10/2009 | Nishida et al. | |
| 8,456,483 | B2 | 6/2013 | Han | |
| 9,870,727 | B2 | 1/2018 | Lee | |
| 2017/0124685 | A1* | 5/2017 | Yamada | G06T 5/002 |

FOREIGN PATENT DOCUMENTS

| | | | |
|---|---|---|---|
| KR | 10-0446631 | B1 | 9/2004 |
| KR | 10-2007-0055366 | A | 5/2007 |
| KR | 10-1073044 | B1 | 10/2011 |

* cited by examiner

*Primary Examiner* — Gene W Lee
(74) *Attorney, Agent, or Firm* — Innovation Counsel LLP

(57) ABSTRACT

A display device includes a display panel and a driving circuit that receives an input image signal and provides an output image signal corresponding to the input image signal to the display panel. The driving circuit includes an edge and slope detector that detects an edge of the input image signal, and determines an angle between the edge and a virtual line parallel to a first direction, a weight calculator that determines a weight, based on the edge and the angle, and a rendering module that compensates for the input image signal, based on the weight, and outputs the output image signal. The weight is determined through an arithmetic operation between the edge and the angle.

20 Claims, 17 Drawing Sheets

DD
100
RGB
CTRL
Driving Controller
DCS,DS
SCS
200
Data Driving Circuit
DP
300
Scan
Driving
Driving
PX11
GL1
DA
NDA
DL1
DLm
GLn
PXnm
DR2
DR1

| | | |
|---|---|---|
| 0<br>(1, 1) | 0<br>(1, 2) | 0<br>(1, 3) |
| 0<br>(2, 1) | 1-WQx2<br>(2, 2) | WQ<br>(2, 3) |
| 0<br>(3, 1) | WQ<br>(3, 2) | 0<br>(3, 3) |

Start
Detect edge
S100
Determine angle of edge
S110
Determine weight based on edge and angle
S120
Correct input image signal using first gamma curve
S130
Convert input image signal to output image signal based on weight
S140
Correct input image signal using second gamma curve
S150

DISPLAY DEVICE AND METHOD OF OPERATION THE SAME

CROSS-REFERENCE TO RELATED APPLICATIONS

This application claims priority to Korean Patent Application No. 10-2022-0006861 filed on Jan. 17, 2022, and all the benefits accruing therefrom under 35 U.S.C. § 119, the content of which in its entirety is herein incorporated by reference.

BACKGROUND

Embodiments of the present disclosure described herein relate to a display device.

A display device includes a display panel including a plurality of pixels. Each of the plurality of pixels may provide any one of various color lights such as a red light, a green light, and a blue light.

A desired image may be displayed by adjusting the intensity of light emitted from each of the plurality of pixels.

The plurality of pixels may have various sizes and may be arranged in various configurations.

SUMMARY

Embodiments of the present disclosure provide a display device, capable of preventing the quality of an image from being degraded due to the manner of arranging pixels, and a method for operating the same.

According to an embodiment, a display device includes a display panel and a driving circuit that receives an input image signal and provides an output image signal corresponding to the input image signal to the display panel. The driving circuit includes an edge and slope detector that detects an edge of the input image signal, and determines an angle between the edge and a virtual line parallel to a first direction, a weight determiner that receives the edge and the angle from the edge and slope detector and determines a weight, based on the edge and the angle, and a rendering module that receives the weight from the weight determiner and compensates for the input image signal, based on the weight, and outputs the output image signal.

According to an embodiment, the edge and slope detector may determine a first edge through the convolution operation of the input image signal and a first filter, may determine a second edge through a convolution operation of the input image signal and a second filter, and may output the edge based on the first edge and the second edge.

According to an embodiment, the edge may be determined through Equation, $EG=|EG\_x|+|EG\_y|$, where EG denotes the edge, EG_x denotes the first edge, and the EG_y denotes the second edge.

According to an embodiment, as the value of the edge is increased, the weight may be increased. As the angle is decreased, the weight may be increased.

According to an embodiment, the edge may be determined through Equation, $EG=\sqrt{EG\_x^2+EG\_y^2}$, where EG denotes the edge, EG_x denotes the first edge, and the EG_y denotes the second edge.

According to an embodiment, the first filter may include a first matrix, and the second filter may include a second matrix, $$gx=\begin{bmatrix}1 & 0 & -1\\ 1 & 0 & -1\\ 1 & 0 & -1\end{bmatrix},\ gy=\begin{bmatrix}1 & 1 & 1\\ 0 & 0 & 0\\ -1 & -1 & -1\end{bmatrix},$$

where gx denotes the first matrix and gy denotes the second matrix.

According to an embodiment, the weight determiner may include a first lookup table for storing a first compensation value corresponding to the edge and a second lookup table for storing a second compensation value corresponding to the angle.

According to an embodiment, the weight may be determined through Equation, $W=(LUT\_EG\times LUT\_AG)$, where W denotes the weight, LUT_EG denotes the first compensation value, and LUT_AG denotes the second compensation value.

According to an embodiment, the weight may be a compensated weight which is determined through Equation, $WQ=(LUT\_EG\times LUT\_AG)\times G\_q$, where WQ denotes the compensated weight, LUT_EG denotes the first compensation value, LUT_AG denotes the second compensation value, and G_q denotes a panel compensation value.

According to an embodiment, the display panel may include first to third pixels disposed in first to third pixel areas.

According to an embodiment, the first pixel area may be disposed in a first pixel row, and the second pixel area and the third pixel area may be disposed in a second pixel row adjacent to the first pixel row.

According to an embodiment, the input image signal may include first to third color signals corresponding to the first to third pixels, respectively.

According to an embodiment, the rendering module may perform a rendering operation for the first color signal using a first rendering filter including the weight, perform a rendering operation for the second color signal using a second rendering filter including the weight, and perform a rendering operation for the third color filter using a third rendering filter including the weight.

According to another aspect of the present disclosure, a method for operating a display device includes detecting an edge of the input image signal, determining an angle between the edge and a virtual line parallel to a first direction, determining a weight, based on the edge and the angle, converting the input image signal, based on the weight, and outputting the output image signal.

According to an embodiment, the detecting of the edge may include determining a first edge through the convolution operation of the input image signal and a first filter, determining a second edge through a convolution operation of the input image signal and a second filter, and outputting the edge based on the first edge and the second edge.

According to an embodiment, the edge may be determined through Equation, $EG=|EG\_x|+|EG\_y|$, where EG denotes the edge, EG_x denotes the first edge, and the EG_y denotes the second edge.

According to an embodiment, as the value of the edge is increased, the weight is increased. As the angle is decreased, the weight may be increased.

According to an embodiment, the edge may be determined through Equation, $EG=\sqrt{EG\_x^2+EG\_y^2}$, where EG denotes the edge, EG_x denotes the first edge, and the EG_y denotes the second edge.

According to an embodiment, the weight may be determined through Equation, $WQ=(LUT\_EG\times LUT\_AG)\times G\_q$, where WQ denotes the compensated weight, LUT_EG denotes a first compensation value corresponding to the edge, and LUT_AG denotes a second compensation value corresponding to the angle.

According to an embodiment, the display panel may include a first pixel, a second pixel, and a third pixel disposed in a first pixel area, a second pixel area, and a third pixel area, respectively, and the first pixel area may be disposed in a first pixel row, and the second pixel area and the third pixel area may be disposed in a second pixel row adjacent to the first pixel row.

BRIEF DESCRIPTION OF THE FIGURES

The above and other objects and features of the present disclosure will become apparent by describing in detail embodiments thereof with reference to the accompanying drawings.

FIGS. 14A, 14B, and 14C illustrate rendering filters of a rendering module illustrated in FIG. 5.

DETAILED DESCRIPTION

Figure 1:
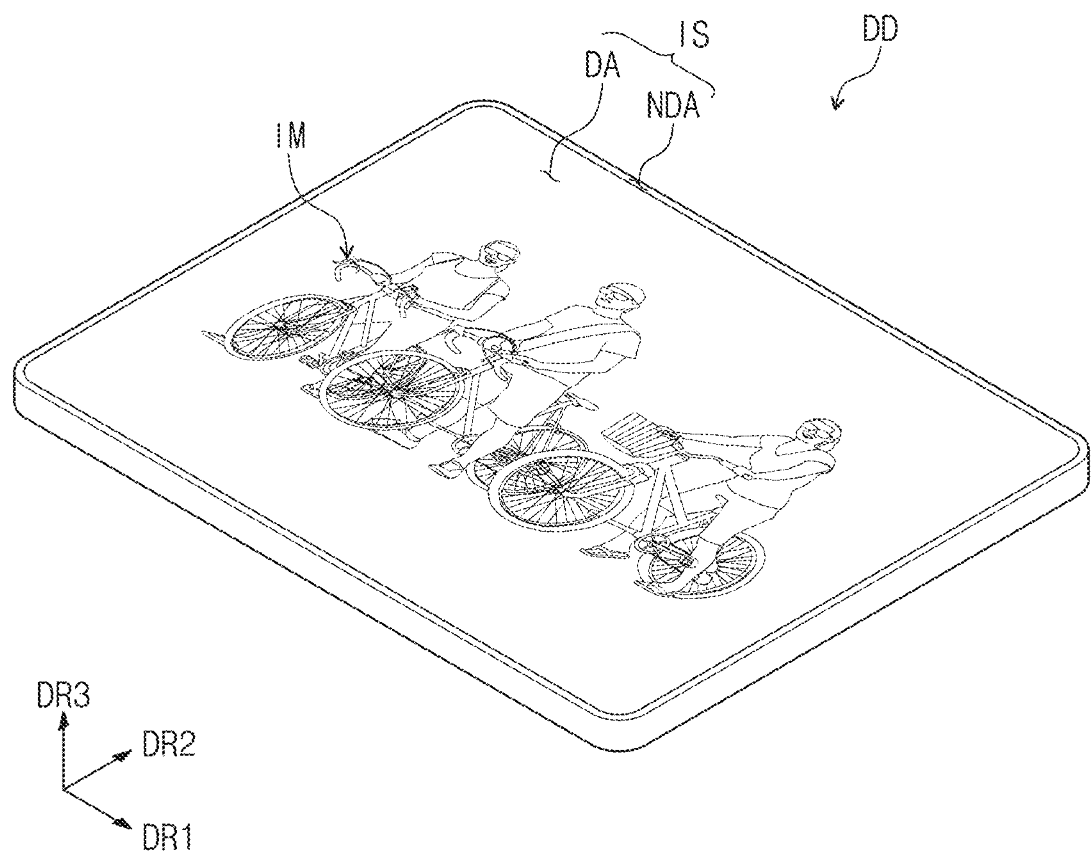
FIG. 1 is a perspective view of a display device, according to an embodiment of the present disclosure.

In the specification, the expression that a first component (or region, layer, part, portion, etc.) is "on", "connected to", or "coupled to" a second component means that the first component is directly on, connected to, or coupled to the second component or means that a third component is interposed therebetween.

The same reference numeral refers to the same component. In addition, in drawings, thicknesses, proportions, and dimensions of components may be exaggerated to describe the technical features effectively. The term "and/or" includes any and all combinations of one or more of associated components.

Although the terms "first", "second", etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The singular forms are intended to include the plural forms unless the context clearly indicates otherwise.

In addition, the terms "under", "at a lower portion", "above", "an upper portion" are used to describe the relationship between components illustrated in drawings. The terms are relative and are described with reference to a direction indicated in the drawing.

It will be further understood that the terms "comprises," "comprising," "includes," or "including," or "having" specify the presence of stated features, numbers, steps, operations, components, parts, or the combination thereof, but do not preclude the presence or addition of one or more other features, numbers, steps, operations, components, components, and/or the combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

FIG. 1 is a perspective view of a display device, according to an embodiment of the present disclosure.

Referring to FIG. 1, a display device DD may be a device activated in response to an electrical signal. According to the present disclosure, the display device DD may include a smaller or medium-size display device such as a cellular phone, a tablet PC, a laptop computer, a vehicle navigation, or a game console as well as a large-size display device such as a television or a monitor. The above examples are provided only for the illustrative purpose, and it is obvious that the display device DD may be applied to any other display device(s) without departing from the concept of the present disclosure.

The display device DD has a rectangular shape having a longer side in a first direction DR1 and a shorter side in a second direction DR2 crossing the first direction DR1. However, the shape of the display device DD is not limited thereto, but various display devices DD having various shapes may be provided. The display device DD may display an image IM in a third direction DR3 on a display surface IS parallel to the first direction DR1 and the second direction DR2. The display surface IS to display the image IM may correspond to a front surface of the display device DD.

According to an embodiment, a front surface (or top surface) and a rear surface (or a bottom surface) of each of constituents are defined based on a direction that the image IM is displayed. The front surface and the rear surface are opposite to each other in the third direction DR3, and a normal direction to the front surface and the rear surface may parallel to the third direction DR3.

The spacing between the front surface and the rear surface in the third direction DR3 may correspond to the thickness of the display device DD in the third direction DR3. Meanwhile, the first direction DR1, the second direction DR2, and the third direction DR3 may be relative concepts and may be changed to different directions.

The display device DD may sense an external input applied from the outside. The external input may include various types of inputs that are provided from the outside of the display device DD. According to an embodiment of the present disclosure, the display device DD may sense an external input of the user which is applied from the outside. The external input of the user may include any one of various external inputs such as a part of a body of the user, light, heat, a gaze, or pressure, or the combination thereof. In addition, the display device DD may sense the external input of the user which is applied to the side surface or the back surface of the display device DD depending on the structures of the display device DD, and the input of the user is not limited to any one embodiment. For example, according to an embodiment of the present disclosure, the external input may include an input made by an input device (e.g., a stylus pen, an active pen, a touch pen, an electronic pen, or an e-pen).

The display surface IS of the display device DD may include a display area DA and a non-display area NDA. The display area DA may be an area for displaying the image IM. A user views the image IM through the display area DA. According to the present embodiment, the display area DA is illustrated as a rectangular shape rounded in vertexes. However, the shape is provided for the illustrative purpose. For example, the display area DA may have various shapes, and the shape is not limited to any one embodiment.

The non-display area NDA is disposed adjacent to the display area DA. The non-display area NDA may have a specific color. The non-display area NDA may surround the display area DA. The shape of the display area DA may actually be defined by the non-display area NDA. However, the above shape of the display area DA is provided for the illustrative purpose. For example, the non-display area NDA may be disposed to be adjacent to only one side of the display area DA or may be omitted. According to an embodiment of the present disclosure, the display device DD may include various embodiments, and the display device is not limited to any one embodiment.

Figure 2:
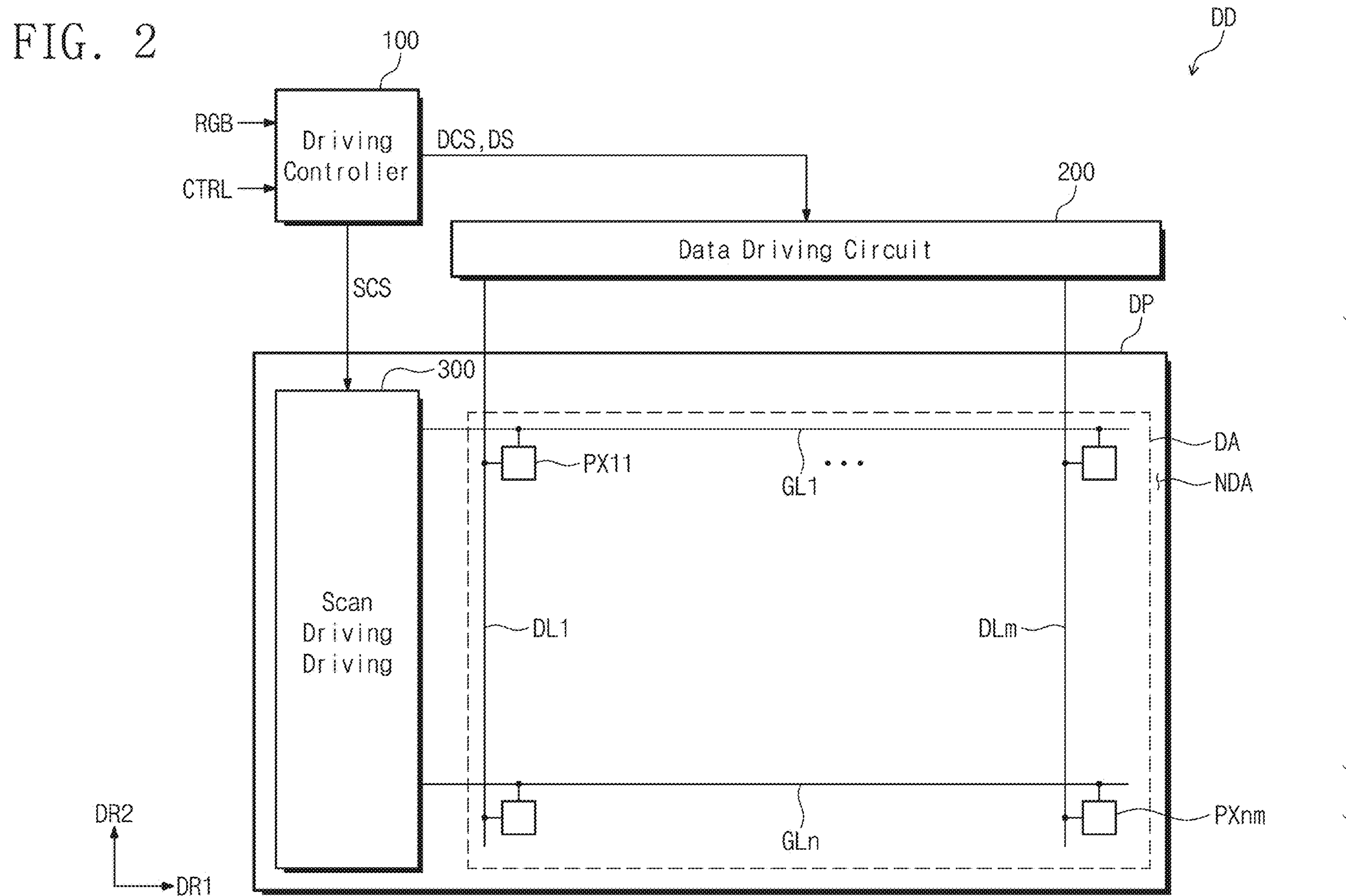
FIG. 2 is a block diagram of a display device, according to an embodiment of the present disclosure.

FIG. 2 is a block diagram of a display device according to an embodiment of the present disclosure.

Referring to FIG. 2, the display device DD includes a driving controller 100, a data driving circuit 200, and a display panel DP.

The driving controller 100 receives an input image signal RGB and a control signal CTRL. The driving controller 100 generates an output image signal DS by converting a data format of the input image signal RGB to be appropriate to the interface specification of the data driving circuit 200. The driving controller 100 outputs a scan control signal SCS and a data control signal DCS to the data driving circuit 200.

The data driving circuit 200 receives the data control signal DCS and the output image signal DS from the driving controller 100. The data driving circuit 200 converts the output image signal DS into data signals and then outputs the data signals to a plurality of data lines DL1 to DLm to be described later. The data signals refer to analog voltages corresponding to grayscale levels of the output image signal DS.

According to an embodiment of the present disclosure, the display panel DP may include an emissive display panel. For example, the display panel DP may be an organic light emitting display panel, an inorganic light emitting display panel, or a quantum dot light emitting display panel. A light emitting layer of the organic light emitting display panel may include an organic light emitting material. A light emitting layer of the inorganic light emitting display panel may include an inorganic light emitting material. A light emitting layer of the quantum dot light emitting display panel may include a quantum dot and a quantum rod. Hereinafter, the display panel DP according to the present embodiment will be referred to as the organic light emitting display panel.

The display panel DP includes scan lines GL1 to GLn, the data lines DL1 to DLm, and pixels PX11 to PXnm. The display panel DP may further include a scan driving circuit 300. According to an embodiment, the scan driving circuit 300 may be disposed at a first side of the display panel DP. The scan lines GL1 to GLn extend in the first direction DR1 from the scan driving circuit 300.

The driving controller 100, the data driving circuit 200, and the scan driving circuit 300 are driving circuits to provide data signals, which correspond to the input image signal RGB of the display panel DP, to the pixels PX.

The pixels PX11 to PXnm may be disposed in the display area DA of the display panel DP, and the scan driving circuit 300 may be disposed in the non-display area NDA of the display panel DP.

The scan lines GL1 to GLn may extend in the first direction DR1 from the scan driving circuit 300 and may be arranged to be spaced apart from each other in the second direction DR2. The data lines DL1 to DLm may extend in the second direction DR2 from the data driving circuit 200 and may be arranged to be spaced apart from each other in the first direction DR1.

Each of the pixels PX11 to PXnm may be connected to a corresponding scan line of the scan lines GL1 to GLn and a corresponding data line of the data lines DL1 to DLm. Although FIG. 2 illustrates that each of the pixel PX11 to PXnm is connected to one scan line, the present disclosure is not limited thereto. Each of pixels PX11 to PXnm may be electrically connected to two scan lines.

Each of the pixels PX11 to PXnm may include a light emitting device (not illustrated) and a pixel circuit (not illustrated) to control a light emitting operation of the light emitting device. According to an embodiment, a light emitting device may be an organic light emitting diode. However, the present disclosure is not limited thereto.

The scan driving circuit 300 receives the scan control signal SCS from the driving controller 100. The scan driving circuit 300 may output scan signals to the scan lines GL1 to GLn in response to the scan control signal SCS. According to an embodiment, the scan driving circuit 300 may be formed in the same process as that of the pixel circuit included in the pixels PX11 to PXnm.

Figure 3:
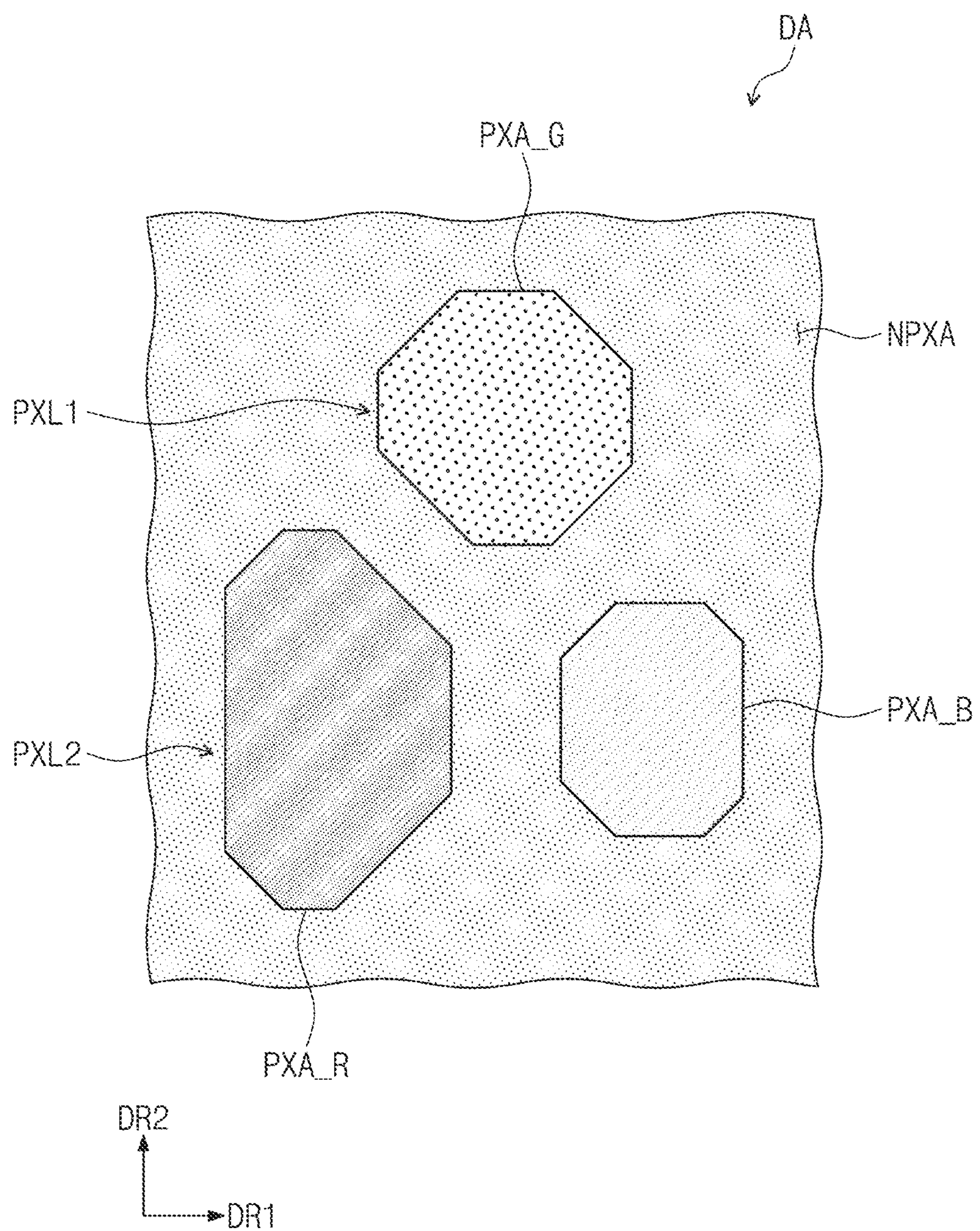
FIG. 3 is a plan view of a display area of a display panel, according to an embodiment of the present disclosure.

FIG. 3 is a plan view of a display area of a display panel, according to an embodiment of the present disclosure.

Referring to FIG. 3, first to third pixel areas PXA_R, PXA_G, and PXA_B may be disposed in the display area DA of the display panel DP (see FIG. 2).

According to an embodiment, the first to third pixel areas PXA_R, PXA_G, and PXA_B are repeatedly disposed throughout the entire portion of the display area DA. A peripheral area NPXA is disposed in a peripheral portion of the first to third pixel areas PXA_R, PXA_G, and PXA_B. The peripheral area NPXA sets boundaries of the first to third pixel areas PXA_R, PXA_G, and PXA_B to prevent colors of the first to third pixel areas PXA_R, PXA_G, and PXA_B from being mixed with each other.

According to the present embodiment, although the first to third pixel areas PXA_R, PXA_G, and PXA_B are illustrated as having mutually different sizes in a plan view, the present disclosure is not limited thereto. The sizes of at least two of the first to third pixel areas PXA_R, PXA_G, and PXA_B may be equal to each other. Although FIG. 3 illustrates that the first to third pixel areas PXA_R, PXA_G, and PXA_B have a polygonal shape in a plan view, the present disclosure is not limited thereto. The first to third pixel areas PXA_R, PXA_G, and PXA_B may have mutually different polygonal shapes such as a rectangle, a rhombus, and a pentagon.

According to an embodiment, the first pixel area PXA_R may provide first color light (e.g., red light), the second pixel area PXA_G may provide second color light (e.g., green light), and the third pixel area PXA_B may provide third color light (e.g., blue light).

The first to third pixel areas PXA_R, PXA_G, and PXA_B may correspond to first to third pixels of the pixels PX11 to PXnm, respectively. The first to third pixels may be red, green and blue pixels, respectively.

The second pixel area PXA_G is disposed in a first pixel row PXL1, and the first pixel area PXA_R and the third pixel area PXA_B are disposed in a second pixel row PXL2 adjacent to the first pixel row PXL1. A color fringing phenomenon may be viewed by the user due to such a pixel arrangement.

Figure 4:
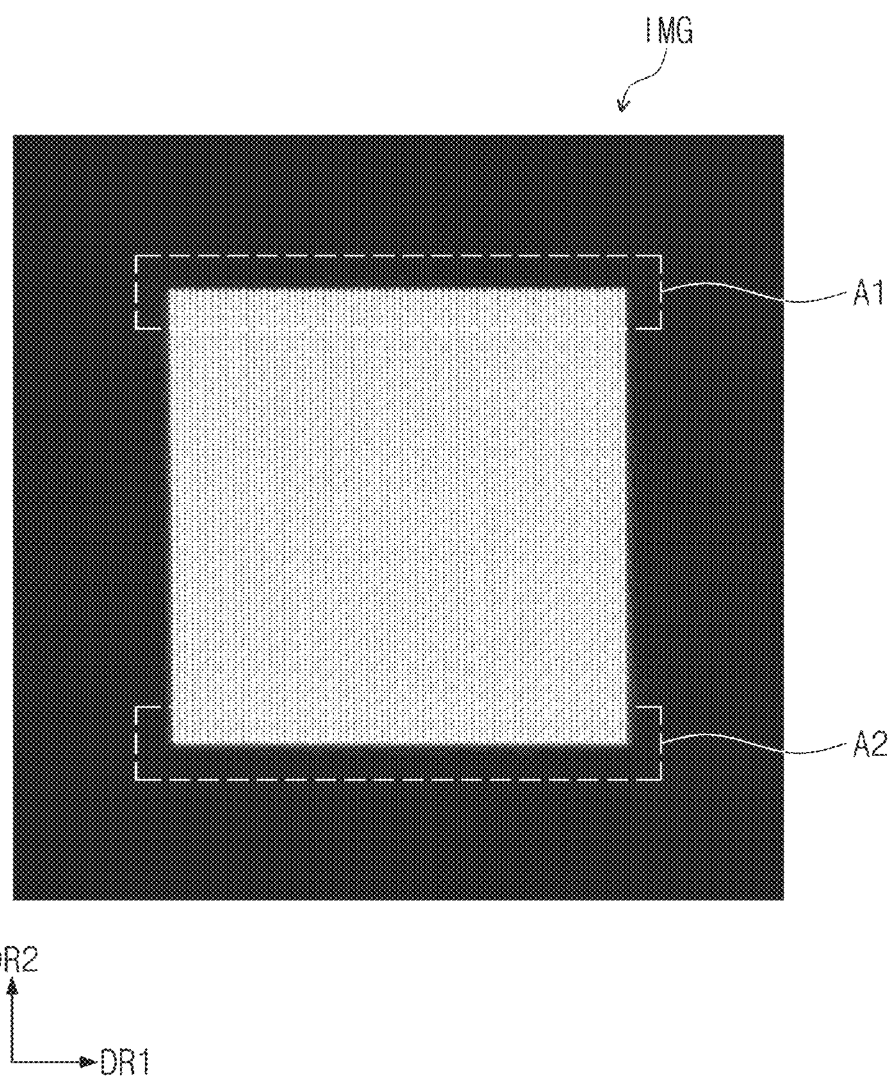
FIG. 4 illustrates an image pattern displayed on a display panel.

FIG. 4 illustrates an image pattern displayed on a display panel.

Referring to FIG. 4, an image IMG displayed on the display panel DP includes a background image having a black level and a box image having a white level. A green light image may be displayed in a boundary area A1 between the background image and the box image, and a magenta light image may be displayed in a boundary area A2.

As described above, undesired images are displayed in the boundary areas A1 and A2, which is caused by the arrangement of the first to third pixel areas PXA_R, PXA_G, and PXA_B illustrated in FIG. 3.

Since the second pixel area PXA_G providing the green light is disposed in the first pixel row PXL1, the green light may be viewed in the boundary area A1. In addition, since the first pixel area PXA_R providing the red light and the third pixel area PXA_B providing the blue light are disposed in the second pixel row PXL2, a magenta light may be viewed in the boundary area A2.

Figure 5:
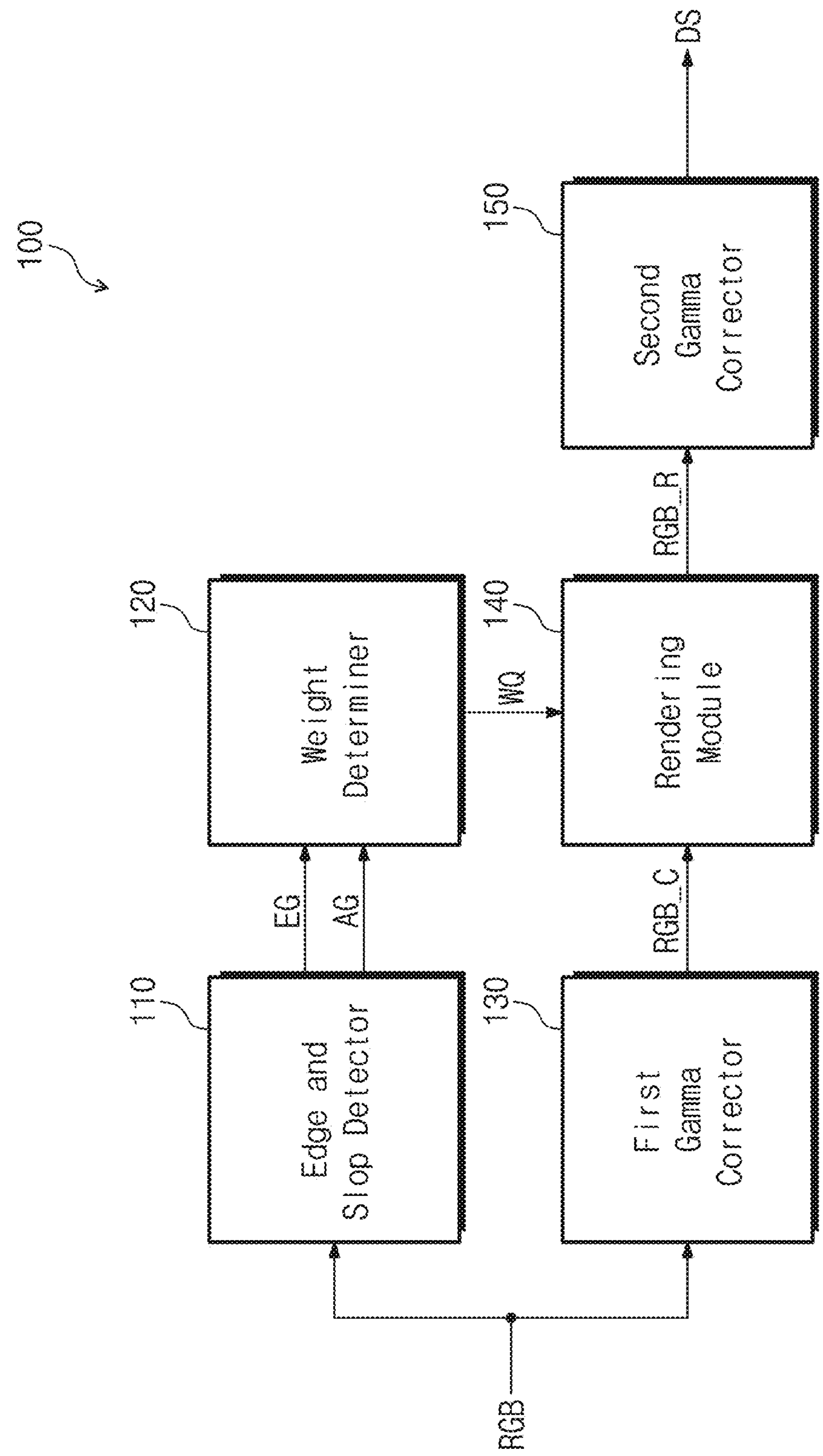
FIG. 5 is a block diagram illustrating a configuration of a driving controller, according to an embodiment of the present disclosure.

FIG. 5 is a block diagram illustrating the configuration of the driving controller 100 according to an embodiment of the present disclosure.

Referring to FIG. 5, the driving controller 100 includes an edge and slope detector 110, a weight determiner 120, a first gamma corrector 130, a rendering module 140, and a second gamma corrector 150.

The edge and slope detector 110 detects an edge (e.g., a boundary line) of the input image signal RGB and determines the slope of the detected edge.

The edge of the input image signal RGB may be detected, when the differential value between input image signals RGB corresponding to two adjacent pixels of the pixels PX11 to PXnm (see FIG. 2) is greater than a reference value. The edge and slope detector 110 may detect the edge by performing a convolution operation for the input image signal RGB and a k×k filter (or a mask), where k is a positive integer.

According to an embodiment, the size of the filter may be 3×3.

A first edge EG_x in the first direction DR1 (see FIG. 2) of the input image signal RGB may be determined through Equation 1.

$$EG\_x = RGB \times gx \qquad \text{Equation 1}$$

In Equation 1, 'gx' denotes a widthwise filter.

In other words, the first edge EG_x, which is provided in a widthwise direction, of the input image signal RGB may be obtained by performing a convolution operation for the input image signal RGB and the widthwise filter 'gx'.

A second edge EG_y in the second direction DR2 (see FIG. 2; lengthwise direction) of the input image signal RGB may be determined through Equation 2.

$$EG\_y = RGB \times gy \qquad \text{Equation 2}$$

In Equation 2, 'gx' denotes a widthwise filter.

In other words, the second edge EG_y, which is provided in a lengthwise direction, of the input image signal RGB may be obtained by performing a convolution operation for the input image signal RGB and the lengthwise filter 'gy'.

According to an embodiment, the widthwise filter 'gx' and the lengthwise filter 'gy' may be $$gx = \begin{bmatrix} 1 & 0 & -1 \\ 1 & 0 & -1 \\ 1 & 0 & -1 \end{bmatrix}, \; gy = \begin{bmatrix} 1 & 1 & 1 \\ 0 & 0 & 0 \\ -1 & -1 & -1 \end{bmatrix},$$

According to an embodiment, the widthwise filter 'gx' and the lengthwise filter 'gy' may be $$gx = \begin{bmatrix} 1 & 0 & -1 \\ 2 & 0 & -2 \\ 1 & 0 & -1 \end{bmatrix}, \; gy = \begin{bmatrix} 1 & 2 & 1 \\ 0 & 0 & 0 \\ -1 & -2 & -1 \end{bmatrix},$$

According to an embodiment, the widthwise filter 'gx' and the lengthwise filter 'gy' may be $$gx = \begin{bmatrix} 3 & 0 & -3 \\ 10 & 0 & -10 \\ 3 & 0 & -3 \end{bmatrix}, \; gy = \begin{bmatrix} 3 & 10 & 3 \\ 0 & 0 & 0 \\ -3 & -10 & -3 \end{bmatrix},$$

The sizes and the values of the widthwise filter 'gx' and the lengthwise filter 'gy' are not limited to the above values.

The edge EG of the input image signal RGB may be determined based on the first edge EG_x in the widthwise direction of the input image signal RGB, and the second edge EG_y in the lengthwise direction of the input image signal RGB.

According to an embodiment, the edge EG of the input image signal RGB may be determined through Equation 3.

$$EG = |EG\_x| + |EG\_y| \qquad \text{Equation 3}$$

According to an embodiment, the edge EG of the input image signal RGB may be determined through Equation 4.

$$EG = \sqrt{EG\_x^2 + EG\_y^2} \qquad \text{Equation 4}$$

The angle AG between the edge EG of the input image signal RGB and a virtual line parallel to the first direction DR1 (see FIG. 2) may be determined through Equation 5.

$$AG = \arctan\left(\frac{EG\_y}{EG\_x}\right) \quad \text{Equation 5}$$

As the edges EG of the input image signal RGB determined through Equation 3 and Equation 4 have larger values and the angle AG has a smaller value, a stronger edge intensity is shown in the first direction DR1. In other words, when the input image signal RGB has a larger edge EG and the angle AG has a smaller value, the color fringing phenomenon may be appeared in the boundary areas A1 and A2 as illustrated in FIG. 4.

The weight determiner 120 determines a weight WQ based on the edge EG and the angle AG of the input image signal RGB determined by the edge and slope detector 110. The compensated weight WQ may be a compensation value for the input image signal RGB.

The weight determiner 120 may store a compensation value for each of the edge EG and the angle AG in the form of a lookup table. The weight determiner 120 may include a first lookup table for storing a first compensation value corresponding to the edge and a second lookup table for storing a second compensation value corresponding to the angle. According to an embodiment, when a first compensation value for the edge EG is LUT_EG and a second compensation value for the angle AG is LUT_AG, the weight W may be determined through Equation 6.

$$W = LUT\_EG \times LUT\_AG \quad \text{Equation 6}$$

The weight W is a value determined by multiplying the first compensation value for the edge EG and the second compensation value for the angle AG. The weight determiner 120 determines the compensated weight WQ by multiplying the weight W and a gain G_q which is determined based on the characteristic of the display panel DP (see FIG. 2). The compensated weight WQ may be determined through Equation 7.

$$WQ = W \times G\_q \quad \text{Equation 7}$$

The first gamma corrector 130 receives the input image signal RGB. The first gamma corrector 130 corrects the input image signal RGB using a first gamma characteristic and outputs a corrected image signal RGB_C to the rendering module 140. According to an embodiment, the first gamma corrector 130 may correct the input image signal RGB using the characteristic of a gamma 2.2 curve characteristic, and may output the corrected image signal RGB_C.

The rendering module 140 performs a rendering process based on the corrected image signal RGB_C and the compensated weight WQ, and output a rendered image signal RGB_R.

The second gamma corrector 150 receives the rendered image signal RGB_R. The second gamma corrector 150 corrects the rendered image signal RGB_R using a second gamma characteristic and outputs the output image signal DS. According to an embodiment, the second gamma corrector 150 may correct the rendered image signal RGB_R using the characteristic of a gamma 0.45 curve and may output the output image signal DS. According to an embodiment, the output image signal DS may be a signal obtained by compensating for the deterioration characteristic of the input image signal RGB based on the compensated weight WQ.

According to an embodiment, the driving controller 100 may not include the first gamma corrector 130 and the second gamma corrector 150. When the first gamma corrector 130 and the second gamma corrector 150 is not included in the driving controller 100, the rendering module 140 may compensate for the input image signal RGB based on the input image signal RGB and the compensated weight WQ, and may output the output image signal DS.

According to an embodiment, the driving controller 100 may not include any one of the first gamma corrector 130 and the second gamma corrector 150.

Figure 6A:
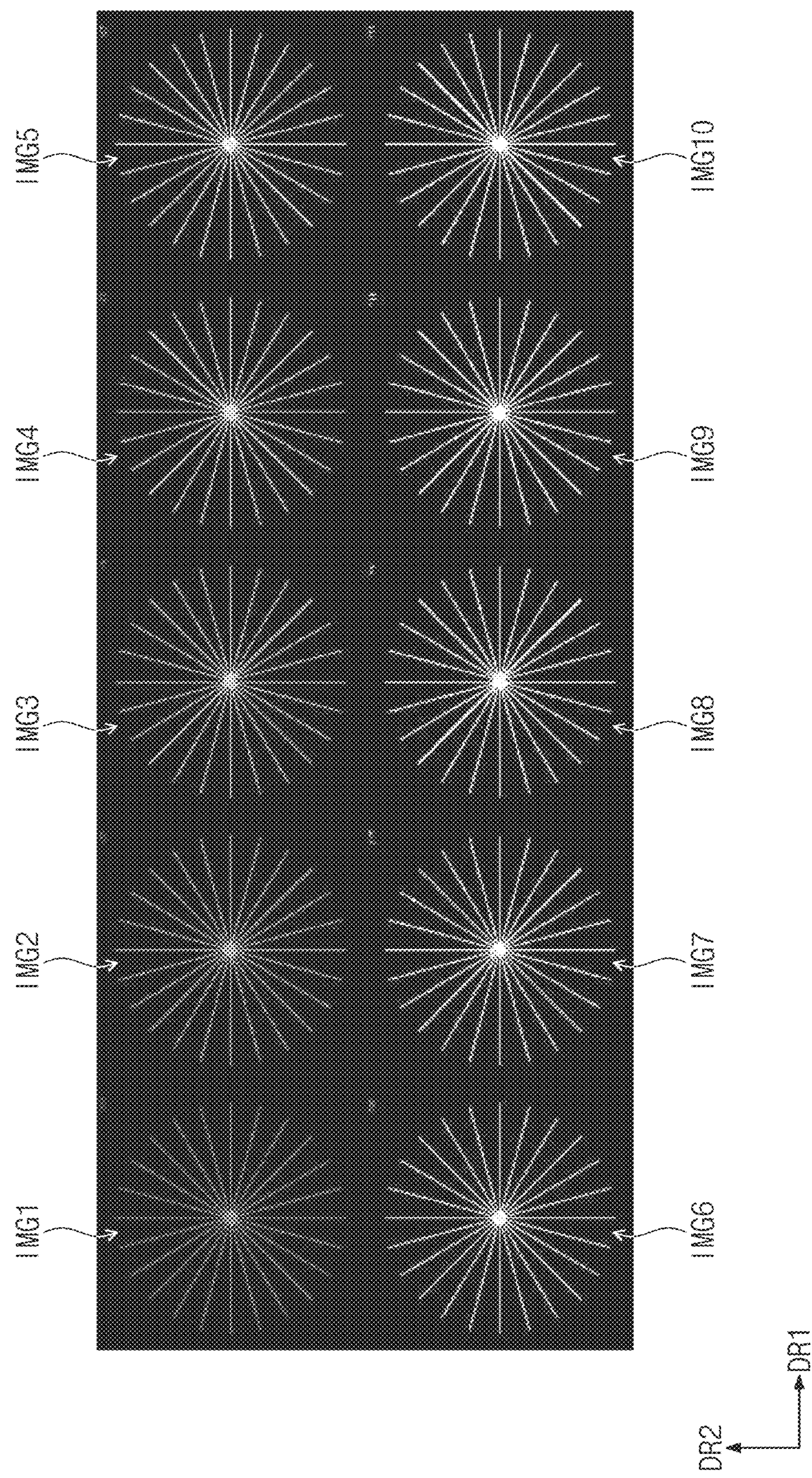
FIG. 6A illustrates test images for testing visibility depending on the edge and the slope of an image.

FIG. 6A illustrates test images for testing visibility depending on the edge and the slope of an image.

Figure 6B:
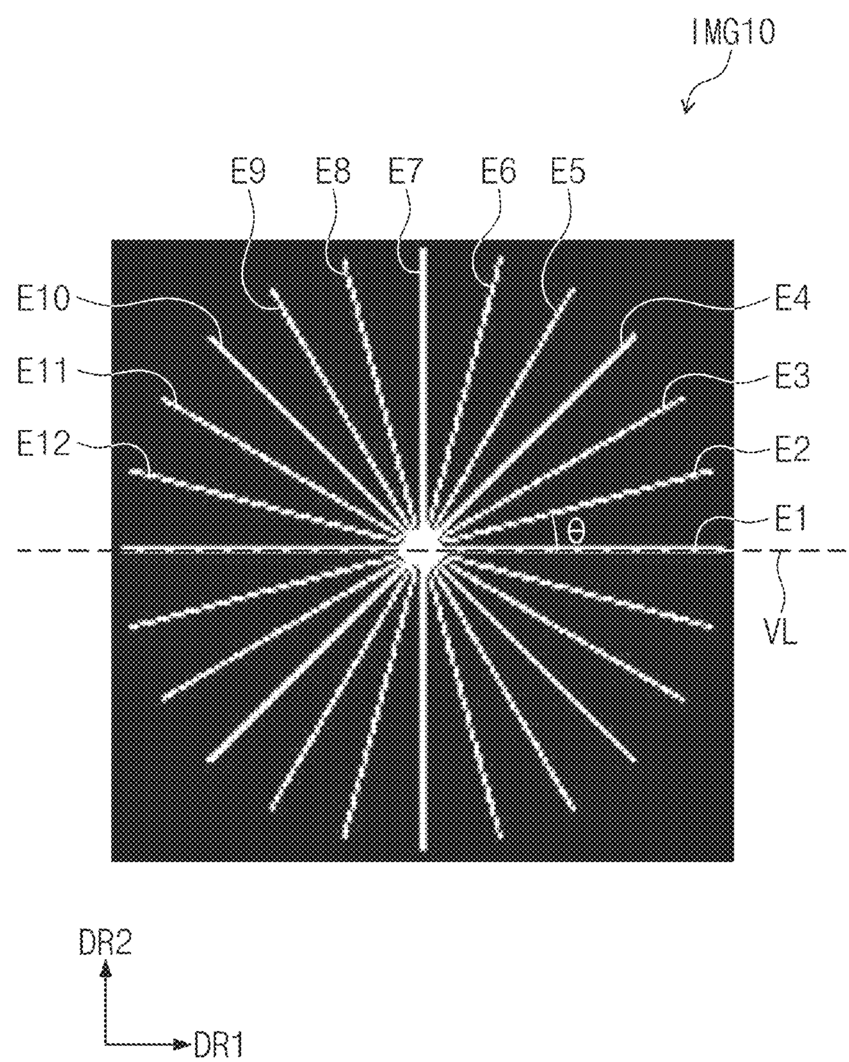
FIG. 6B is a view illustrating a test image which is enlarged.

FIG. 6B is a view illustrating a test image IMG10 which is enlarged.

Referring to FIGS. 6A and 6B, each of the test images IMG1 to IMG10 includes edges E1 to E12.

Each of the edges E1 to E12 has a specific slope with respect to a virtual line VL parallel to the first direction DR1.

A slope difference between two adjacent edges of the edges E1 to E12 is 15 degrees. For example, the angle θ between the edge E1 and the edge E2 is 15 degrees.

In addition, the luminance difference (that is, the edge intensity) between two adjacent images of the test images IMG1 to IMG10 is 10%. For example, when the whole luminance of the edges E1 to E12 of the test image IMG10 is 100%, the luminance of the edges of the test image IMG9 is 90%, the luminance of the edges of the test image IMG8 is 80%, and the luminance of the edges of the test image IMG1 is 10%.

Figure 7:
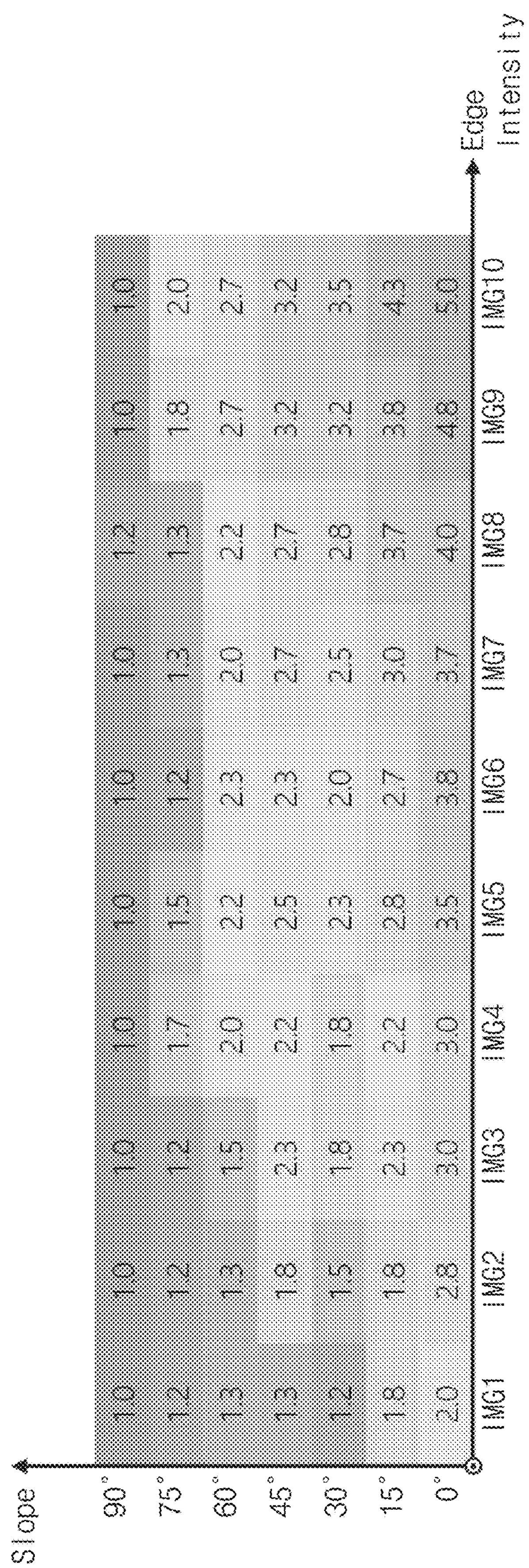
FIG. 7 illustrates evaluation scores of test images illustrated in FIGS. 6A and 6B.

FIG. 7 illustrates evaluation scores of test images illustrated in FIGS. 6A and 6B.

Referring to FIGS. 6A, 6B, and 7, test participants were shown test images IMG1 to IMG10 illustrated in FIGS. 6A and 6B and the visibility of the color fringing phenomenon is scored on a scale of 1.0 to 5.0, depending on the slope of each edge of each of the test images IMG1 to IMG 10.

It may be recognized from FIG. 7 that, as the slop is lowered, that is, the edge is more parallel to the first direction DR1, and the edge intensity is increased, the visibility of the color fringing phenomenon is increased. The edge intensity may be the luminance of the edge.

Figure 8:
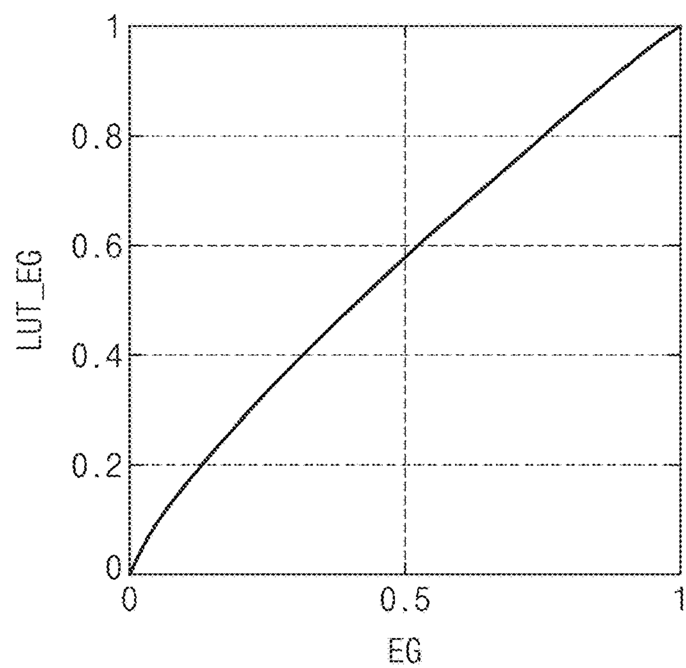
FIG. 8 is a graph illustrating normalization of a compensation value for an edge detected by an edge and slope detector illustrated in FIG. 5.

FIG. 8 is a graph illustrating normalization of the compensation value LUT_EG for the edge EG detected by the edge and slope detector 110 illustrated in FIG. 5.

Figure 9:
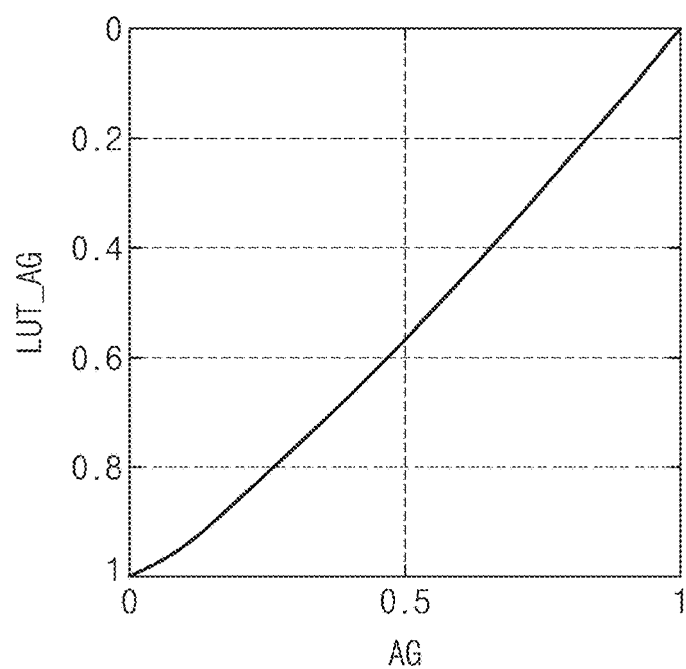
FIG. 9 is a graph illustrating normalization of a compensation value for an angle detected by an edge and slope detector illustrated in FIG. 5.

FIG. 9 is a graph illustrating normalization of the compensation value LUT_AG for the angle AG detected by the edge and slope detector 110 illustrated in FIG. 5.

It may be recognized from FIGS. 7, 8, and 9 that the compensation value LUT_EG for the detected edge EG and the compensation value LUT_AG for the angle AG are in accord with the evaluation result for the visibility. In other words, as the luminance (edge intensity) of the edge is increased, the compensation value LUT_EG is increased. As the slope of the edge is decreased, the compensation value LUT_AG is increased.

Figure 10:
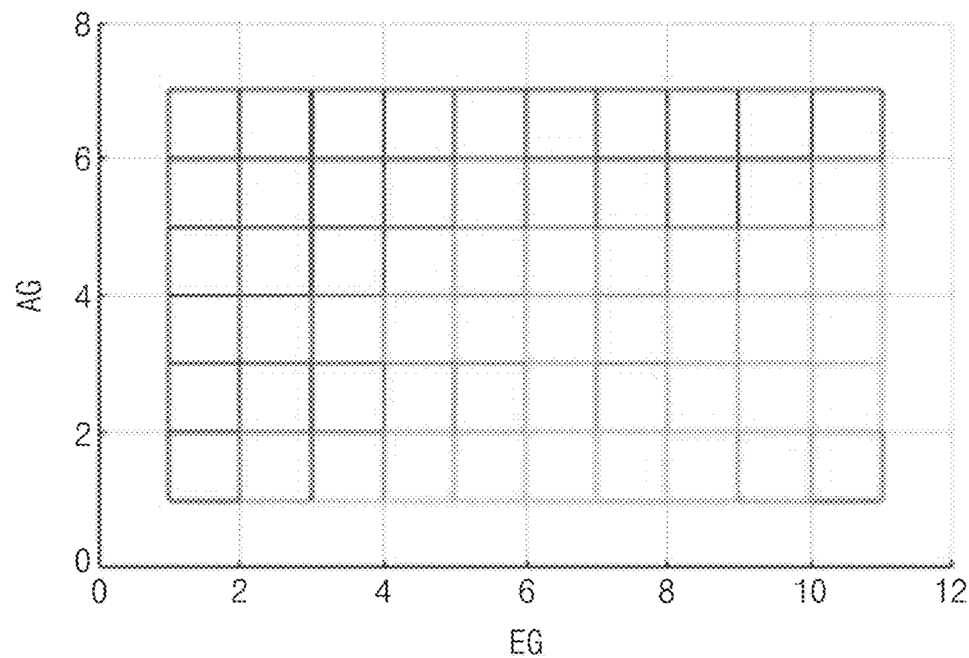
FIG. 10 illustrates a graph of a test result for the visibility illustrated in FIG. 7.

FIG. 10 illustrates a graph of a test result for the visibility illustrated in FIG. 7. As illustrated in FIG. 10, a horizontal axis represents the edge EG, and a vertical axis represents the angle AG.

Figure 11:
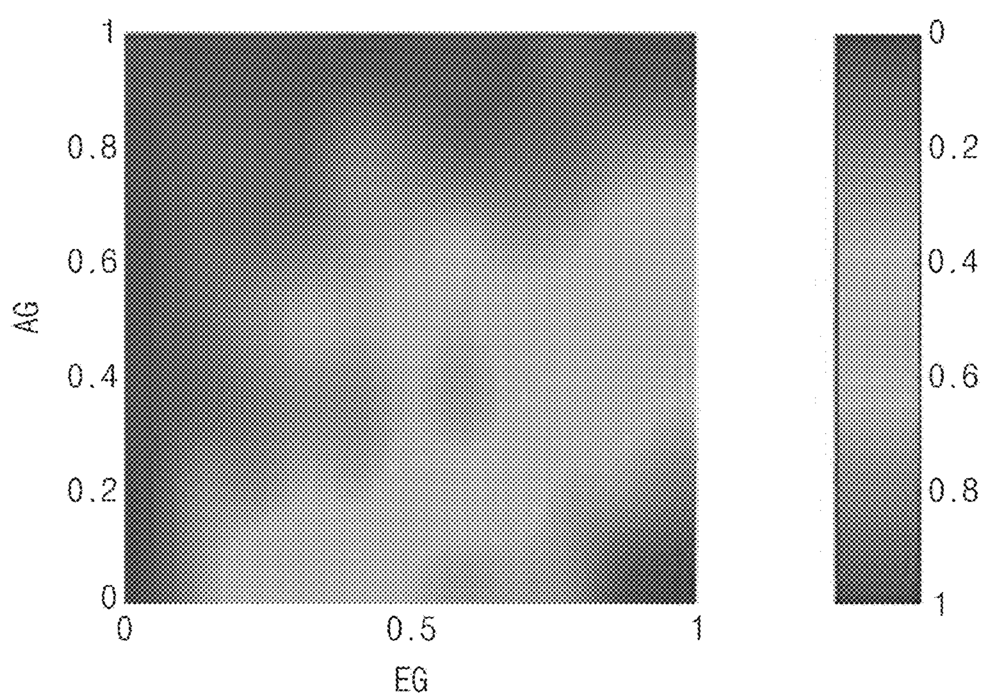
FIG. 11 illustrates that an edge-angle graph of FIG. 10 is up-sampled.

FIG. 11 illustrates that an edge EG-angle AG graph of FIG. 10 is up-sampled.

Since the test result illustrated in FIG. 7 is a result of a test performed under a limited test environment, when the test result is up-sampled, visibility characteristics of the color fringing phenomenon depending on the edge EG and the angle AG may be obtained as illustrated in FIG. 11.

Figure 12:
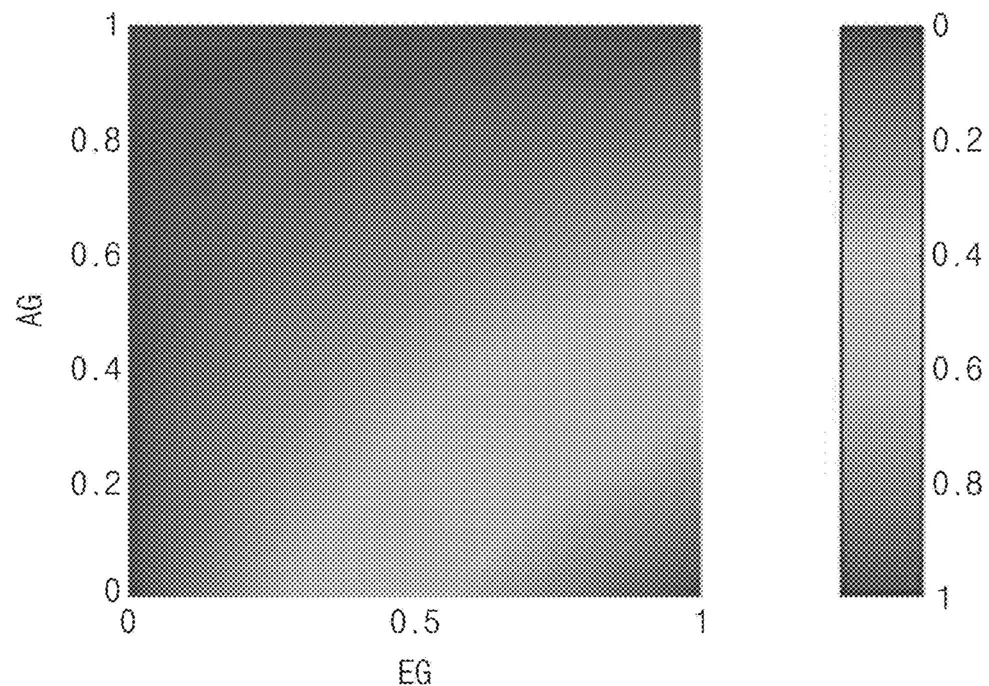
FIG. 12 illustrates a product of the edge and the angle, which are detected by an edge and slope detector illustrated in FIG. 5, when the edge and the angle are normalized.

FIG. 12 illustrates a product of the edge EG and the angle AG (EG×AG), which are detected by the edge and slope detector 110 illustrated in FIG. 5, when the edge EG and the angle AG are normalized. It may be recognized that the graph of the product of the edge EG and the angle AG illustrated in FIG. 12 has a form similar to the form of the graph of the visibility test result up-sampled as illustrated in FIG. 11.

Figure 13:
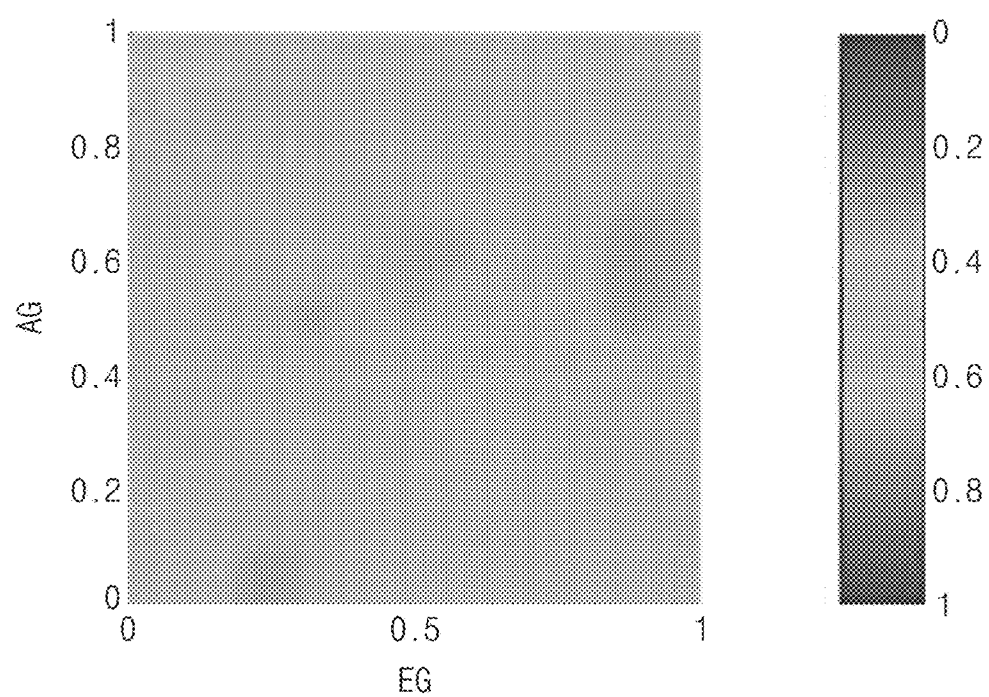
FIG. 13 illustrates the difference between edges and the difference between angles, when the edge and the angle, which are detected by edge and slope detector as illustrated in FIG. 5, are normalized.

FIG. 13 illustrates the difference of the edge EG and the angle AG (EG-AG) when the edge EG and the angle AG, which is detected by edge and slope detector 110 as illustrated in FIG. 5, is normalized. As illustrated in FIG. 13, the differential value between the edge EG and the angle AG approaches '0'.

Figure 14A:
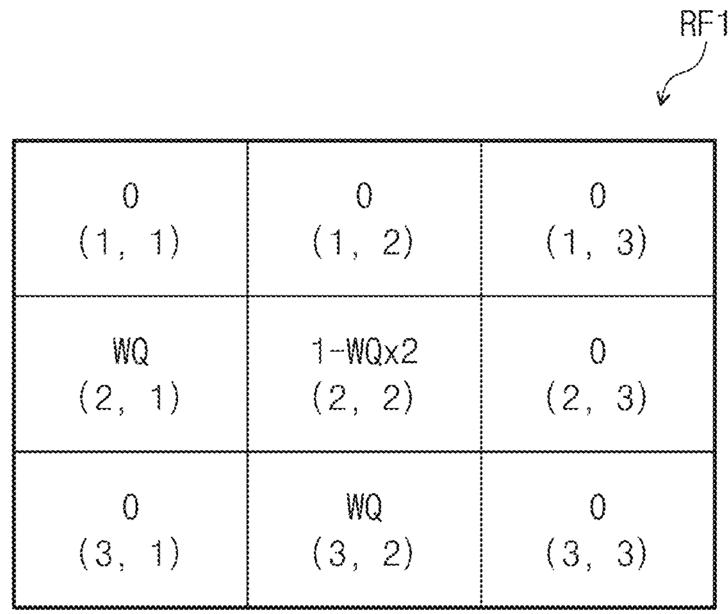
Figure 14B:
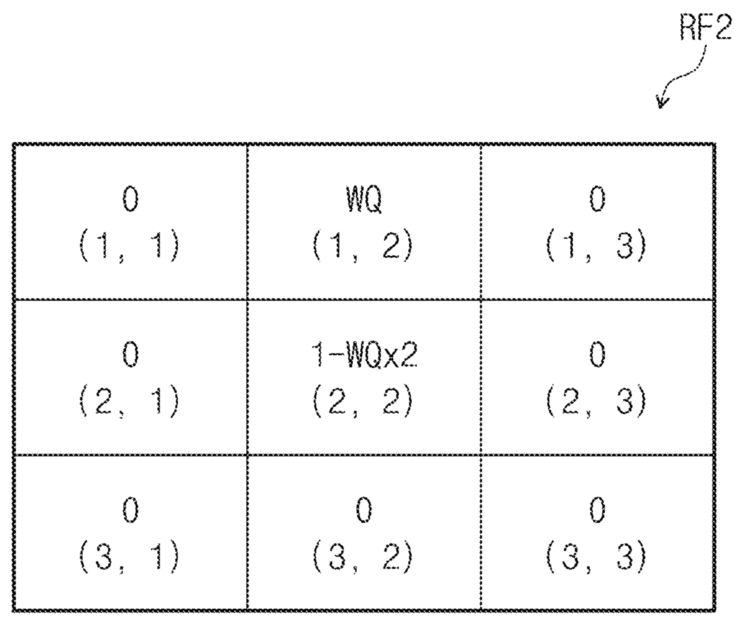

FIGS. 14A, 14B, and 14C illustrate rendering filters of a rendering module illustrated in FIG. 5.

FIG. 14A illustrates a first rendering filter RF1 used for rendering a first color signal (hereinafter, referred to as "R") of the input image signals RGB. The first color signal R may be a red color signal.

Since the first pixel area PXA_R is disposed at the lower left portion as illustrated in FIG. 3, the compensated weight WQ is assigned as rendering coefficients at the coordinates (2, 1) and (3, 2) of the first rendering filter RF1. A value 1−WQ×2 is assigned as a rendering coefficient in at coordinates (2, 2) of the first rendering filter RF1.

FIG. 14B illustrates a second rendering filter RF2 used for rendering a second color signal (hereinafter, referred to as "G") of the input image signals RGB. The second color signal G may be a green color signal.

Since the second pixel area PXA_G is disposed at the upper center portion as illustrated in FIG. 3, the compensated weight WQ is assigned as a rendering coefficient at the coordinates (1, 2) of the second rendering filter RF2. A value 1−WQ×2 is assigned as a rendering coefficient in at coordinates (2, 2) of the second rendering filter RF2.

FIG. 14C illustrates a third rendering filter RF3 used for rendering a third color signal (hereinafter, referred to as "B") of the input image signals RGB. The third color signal may be a blue color signal.

Since the third pixel area PXA_B is disposed at the right lower portion as illustrated in FIG. 3, the compensated weight WQ is assigned as rendering coefficients at the coordinates (2, 3) and (3, 2) of the third rendering filter RF3. A value 1−WQ×2 is assigned as a rendering coefficient in at coordinates (2, 2) of the third rendering filter RF3.

The rendering module 140 illustrated in FIG. 5 may output the rendered image signal RGB_R3 after performing a convolution operation for the first color signal R of the input image signals RGB and the first rendering filter RF1, a convolution operation for the second color signal G of the input image signals RGB and the second rendering filter RF2, and a convolution operation for the third color signal B of the input image signals RGB and the third rendering filter RF3.

Figure 15A:
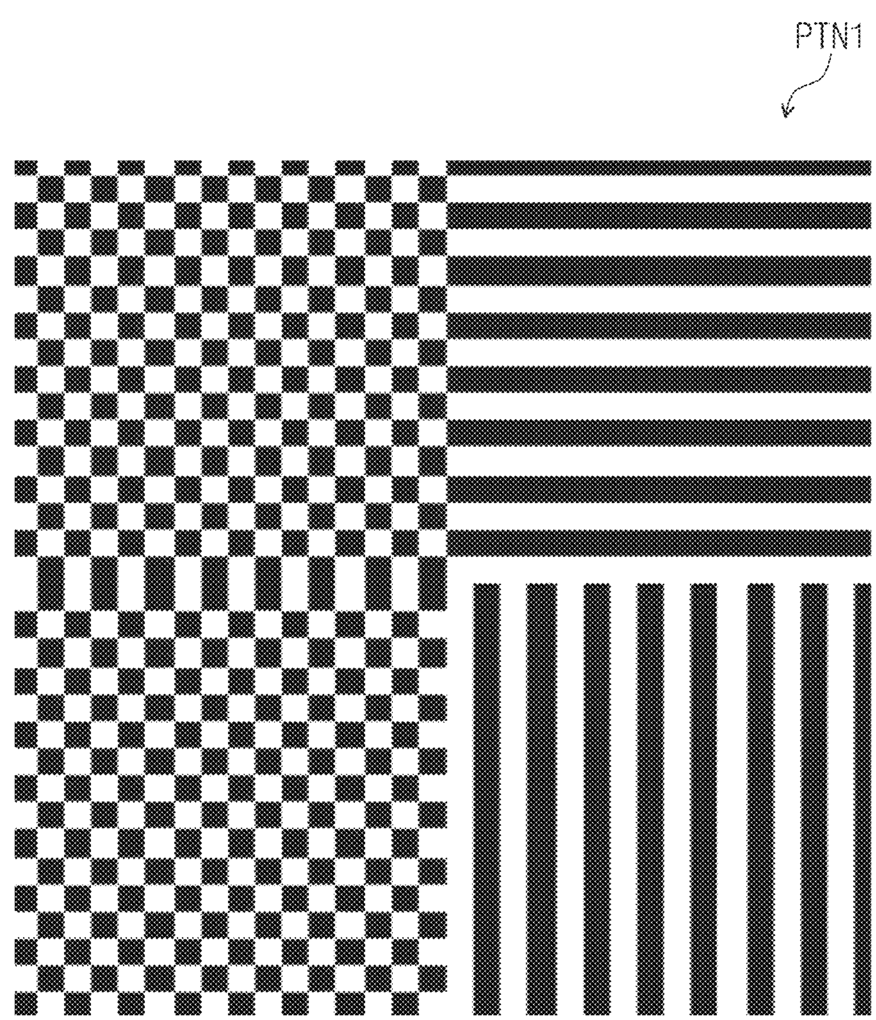
FIG. 15A illustrates a test pattern of an input image signal.

FIG. 15A illustrates a test pattern PTN1 of the input image signal RGB.

Referring to FIG. 15A, the test pattern PTN1 of the input image signal RGB includes a check pattern, a horizontal stripe pattern, and a vertical stripe pattern which are formed by alternately arranging a black level and a white level.

Figure 15B:
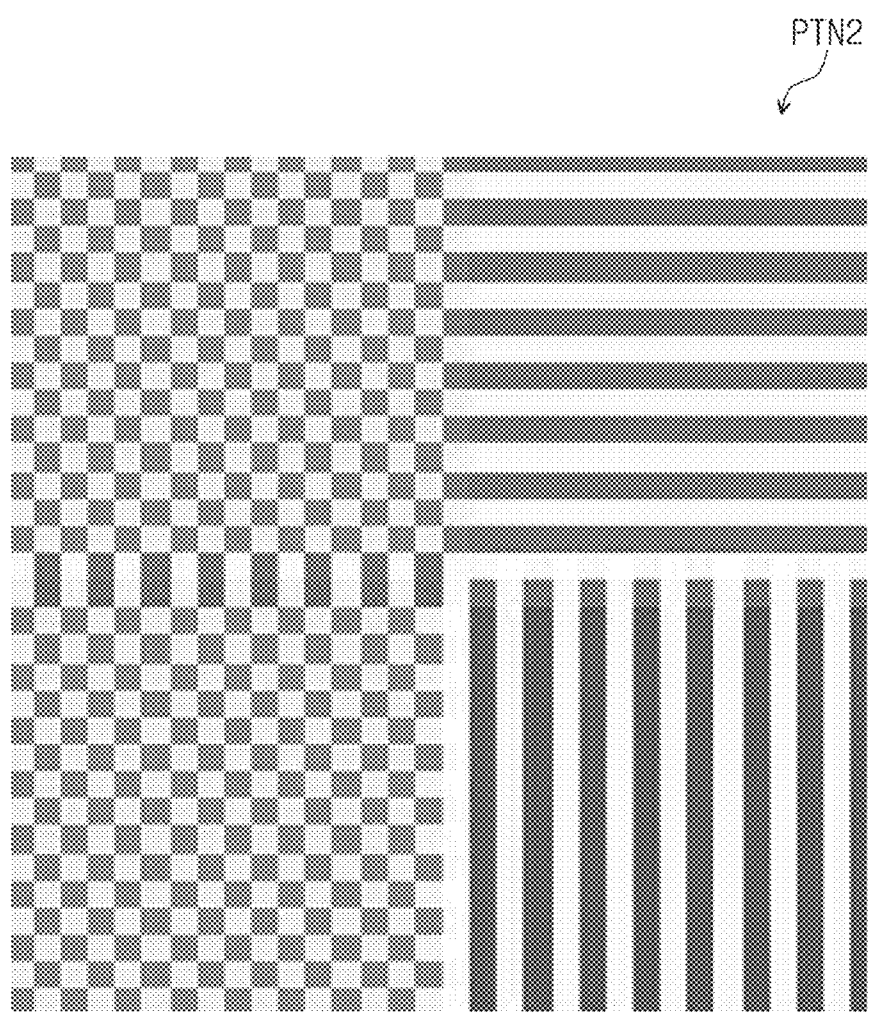
FIGS. 15B and 15C illustrate that a test pattern illustrated in FIG. 15A is displayed on a display device.
Figure 15C:
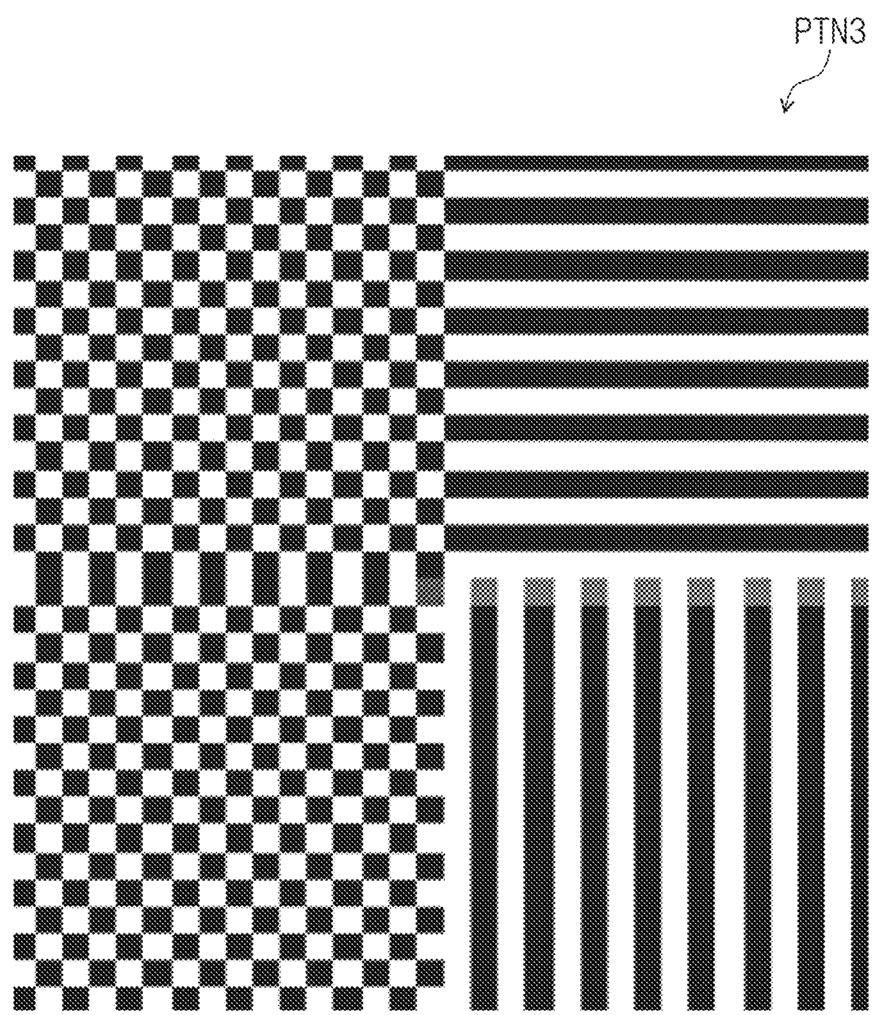

FIGS. 15B and 15C illustrate that the test pattern PTN1 illustrated in FIG. 15A is displayed on the display device.

When low-pass filtering is performed on the input image signal RGB without considering the edge and slope of the input image signal RGB, a test pattern PTN2 illustrated in FIG. 15B may be displayed on the display panel DP (see FIG. 2).

It may be recognized that the test pattern PTN2 illustrated in FIG. 15B has a black level and a white level changed to a magenta level and a gray level, respectively, even though FIG. 15A illustrates the test pattern PTN1 having the black level and the white level.

When the rendering process is performed with respect to the input image signal RGB based on the edge and the slope of the input image signal RGB, the test pattern PTN3 illustrated in FIG. 15C may be displayed on the display panel DP (see FIG. 2).

The test pattern PTN3 illustrated in FIG. 15C has the black level and the white level, which is similar to the test pattern PTN1 illustrated in FIG. 15A.

According to the present disclosure, in which the compensated weight WQ is determined based on the edge and slope of the input image signal RGB and the rendering process is performed using the first to third rendering filters RF1 to RF3 (FIGS. 14A to 14C) including the compensated weight WQ, the test pattern PTN3 similar to the test pattern PTN1 may be displayed on the display panel DP (see FIG. 2).

Figure 16:
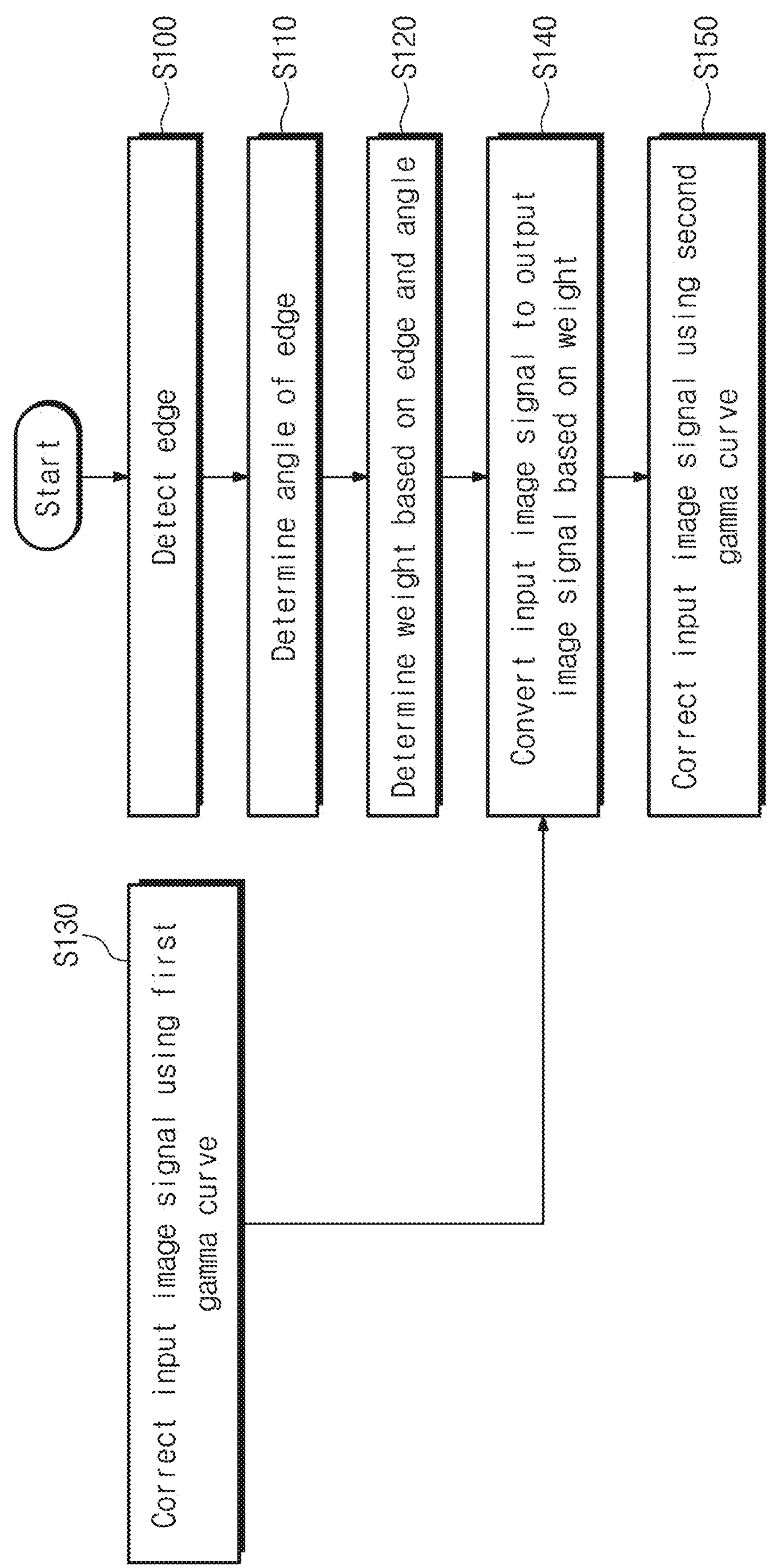
FIG. 16 is a flowchart illustrating a method for controlling a display device, according to an embodiment of the present disclosure.

FIG. 16 is a flowchart of a display device according to an embodiment of the present disclosure.

Although a method for operating the display device has been described with reference to the driving controller illustrated in FIG. 5 for the convenience of explanation, the present disclosure is not limited thereto. In the following description, the duplication of the description made with reference to FIGS. 1 to 15C will be omitted.

Referring to FIGS. 5 and 16, the edge and slope detector 110 detects an edge of the input image signal RGB (S100).

The first edge EG_x in the first direction DR1 (see FIG. 2) (or the horizontal direction) of the input image signal RGB and the second edge EG_y in the second direction DR2 (or the vertical direction) may be determined, and the sum of the first edge EG_x and the second edge EG_y may be output as the edge EG.

The edge and slope detector 110 determines an angle AG between the detected edge EG and a virtual line parallel to the first direction DR1 (see FIG. 2) (S110).

The weight calculator 120 determines a compensated weight WQ based on the edge EG and the angle AG of the input image signal RGB determined by the edge and slope detector 110 (S120).

Optionally, the first gamma corrector 130 may correct the input image signal RGB using a first gamma curve, for example, a gamma 2.2 curve characteristic, and may output the corrected image signal RGB_C. (S130).

The rendering module 140 may perform a rendering process based on the corrected image signal RGB_C and the compensated weight WQ and may output the output image signal DS (S140).

Optionally, the second gamma corrector 150 may correct the rendered image signal RGB_R using a second gamma curve, for example, a gamma 0.45 curve characteristic, and outputs the output image signal DS (S150).

The display device having the above configuration may detect an edge of an input image signal and an edge slope of the input image signal. When the input image signal has the edge and the edge slope degrading the quality of the displayed image, the input image signal may be corrected and an output image signal, which is corrected, may be provided to the display panel. Therefore, the display quality may be prevented from being degraded in the display device having the specific pixel arrangement.

Although an embodiment of the present disclosure has been described for illustrative purposes, those skilled in the art will appreciate that various modifications, and substitutions are possible, without departing from the scope and spirit of the invention as disclosed in the accompanying claims. Accordingly, the technical scope of the present disclosure is not limited to the detailed description of this specification, but should be defined by the claims.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:

a display panel; and a driving circuit which receives an input image signal and provide an output image signal corresponding to the input image signal to the display panel, wherein the driving circuit includes:

an edge and slope detector which detects an edge of the input image signal and determine an angle between the edge and a virtual line parallel to a first direction;

a weight determiner which receives the edge and the angle from the edge and slope detector and determines a weight based on the edge and the angle; and a rendering module which receives the weight from the weight determiner and compensates for the input image signal based on the weight, and output the output image signal.

2. The display device of claim 1, wherein the edge and slope detector determines a first edge through a convolution operation of the input image signal and a first filter, determines a second edge through a convolution operation of the input image signal and a second filter, and outputs the edge based on the first edge and the second edge.

3. The display device of claim 2, wherein the edge is determined through Equation, $EG=|EG\_x|+|EG\_y|$, where EG denotes the edge, EG_x denotes the first edge, and EG_y denotes the second edge.

4. The display device of claim 3, wherein the weight is increased as a value of the edge is increased, and wherein the weight is increased as the angle is decreased.

5. The display device of claim 2, wherein the edge is determined through Equation, $EG=\sqrt{EG\_x^2+EG\_y^2}$, where EG denotes the edge, EG_x denotes the first edge, and EG_y denotes the second edge.

6. The display device of claim 2, wherein the first filter includes a first matrix and the second filter includes a second matrix, $$gx=\begin{bmatrix}1 & 0 & -1\\ 1 & 0 & -1\\ 1 & 0 & -1\end{bmatrix},\ gy=\begin{bmatrix}1 & 1 & 1\\ 0 & 0 & 0\\ -1 & -1 & -1\end{bmatrix}.$$

where gx denotes the first matrix and gy denotes the second matrix.

7. The display device of claim 1, wherein the weight determiner includes:

a first lookup table for storing a first compensation value corresponding to the edge, and a second lookup table for storing a second compensation value corresponding to the angle.

8. The display device of claim 7, wherein the weight is determined through Equation, $W=(LUT\_EG\times LUT\_AG)$, where W denotes the weight, LUT_EG denotes the first compensation value, and LUT_AG denotes the second compensation value.

9. The display device of claim 7, wherein the weight is a compensated weight which is determined through Equation, $WQ=(LUT\_EG\times LUT\_AG)\times G\_q$, where WQ denotes the compensated weight, LUT_EG denotes the first compensation value, LUT_AG denotes the second compensation value, and G_q denotes a panel compensation value.

10. The display device of claim 1, wherein the display panel includes:

a first pixel, a second pixel, and a third pixel disposed in a first pixel area, a second pixel area, and a third pixel area, respectively.

11. The display device of claim 10, wherein the first pixel area is disposed in a first pixel row, and wherein the second pixel area and the third pixel area are disposed in a second pixel row adjacent to the first pixel row.

12. The display device of claim 10, wherein the input image signal includes:

a first color signal, a second color signal, and a third color signal corresponding to the first pixel, the second pixel, and the third pixels, respectively.

13. The display device of claim 12, wherein the rendering module performs a rendering operation for the first color signal using a first rendering filter including the weight, performs a rendering operation for the second color signal using a second rendering filter including the weight, and performs a rendering operation for the third color filter using a third rendering filter including the weight.

14. A method for controlling an operation of a display device, the method comprising:

detecting an edge of an input image signal;

determining an angle between the edge and a virtual line parallel to a first direction;

determining a weight, based on the edge and the angle;

converting the input image signal, based on the weight; and outputting the output image signal.

15. The method of claim 14, wherein the detecting of the edge includes:

determining a first edge through a convolution operation of the input image signal and a first filter;

determining a second edge through a convolution operation of the input image signal and a second filter; and outputting the edge, based on the first edge and the second edge.

16. The method of claim 15, wherein the edge is determined through Equation, $EG=|EG\_x|+|EG\_y|$, and where EG denotes the edge, EG_x denotes the first edge, and EG_y denotes the second edge.

17. The method of claim 16, wherein the weight is increased as the angle is decreased, and wherein the weight is increased as the value of the edge is increased.

18. The method of claim 15, wherein the edge is determined through Equation, $EG=\sqrt{EG\_x^2+EG\_y^2}$, where EG denotes the edge, EG_x denotes the first edge, and EG_y denotes the second edge.

19. The method of claim 14, wherein the weight is determined through Equation, $WQ=(LUT\_EG \times LUT\_AG) \times G\_q$, where WQ denotes the compensated weight, LUT_EG denotes a first compensation value corresponding to the edge, and LUT_AG denotes a second compensation value corresponding to the angle, and G_q denotes a panel compensation value.

20. The method of claim 14, wherein the display panel includes a first pixel, a second pixel, and a third pixel disposed in a first pixel area, a second pixel area, and a third pixel area, respectively, wherein the first pixel area is disposed in a first pixel row, and wherein the second pixel area and the third pixel area are disposed in a second pixel row adjacent to the first pixel row.

* * * * *